June 9, 1925.

R. C. McELREE

FISHING FLOAT

Filed Aug. 7, 1923

1,541,724

Robert C. McElree,
INVENTOR.

BY John M. Spelman
ATTORNEYS.

Patented June 9, 1925.

1,541,724

UNITED STATES PATENT OFFICE.

ROBERT C. McELREE, OF DALLAS, TEXAS, ASSIGNOR OF ONE-HALF TO THOMAS A. WAGGONER, OF DALLAS, TEXAS.

FISHING FLOAT.

Application filed August 7, 1923. Serial No. 656,291.

*To all whom it may concern:*

Be it known that I, ROBERT C. MCELREE, a citizen of the United States, residing at Dallas, in the county of Dallas and State of Texas, have invented certain new and useful Improvements in Fishing Floats, of which the following is a specification.

This invention relates to fishing floats and the like, and refers to a float to be used for night fishing, having a peculiar construction, whereby when the float is actuated suddenly in a vertical movement or actuated to assume other than a vertical position, same will be illuminated to indicate the presence of a fish on the line.

The object of the invention is to provide means for designating to the fisherman at all times whether his line is free or if there is a fish thereon.

A feature of the invention is the simplicity and durability of construction, same being waterproof and so arranged that it will become illuminated as soon as it is suddenly actuated or actuated from the vertical or normal floating position.

Another feature is that the wearing parts may be easily replaced without affecting the arrangement or the function of the other elements. When the device is not in use it may be placed upon its side with no possibility of a connection being made to wear out the battery or the bulb unnecessarily, as long as it is not suddenly actuated from this position.

Other objects and features as well as the above, will be set forth in the course of the following description, taken in connection with the drawings attached hereto as follows.

Figures 1, 2:
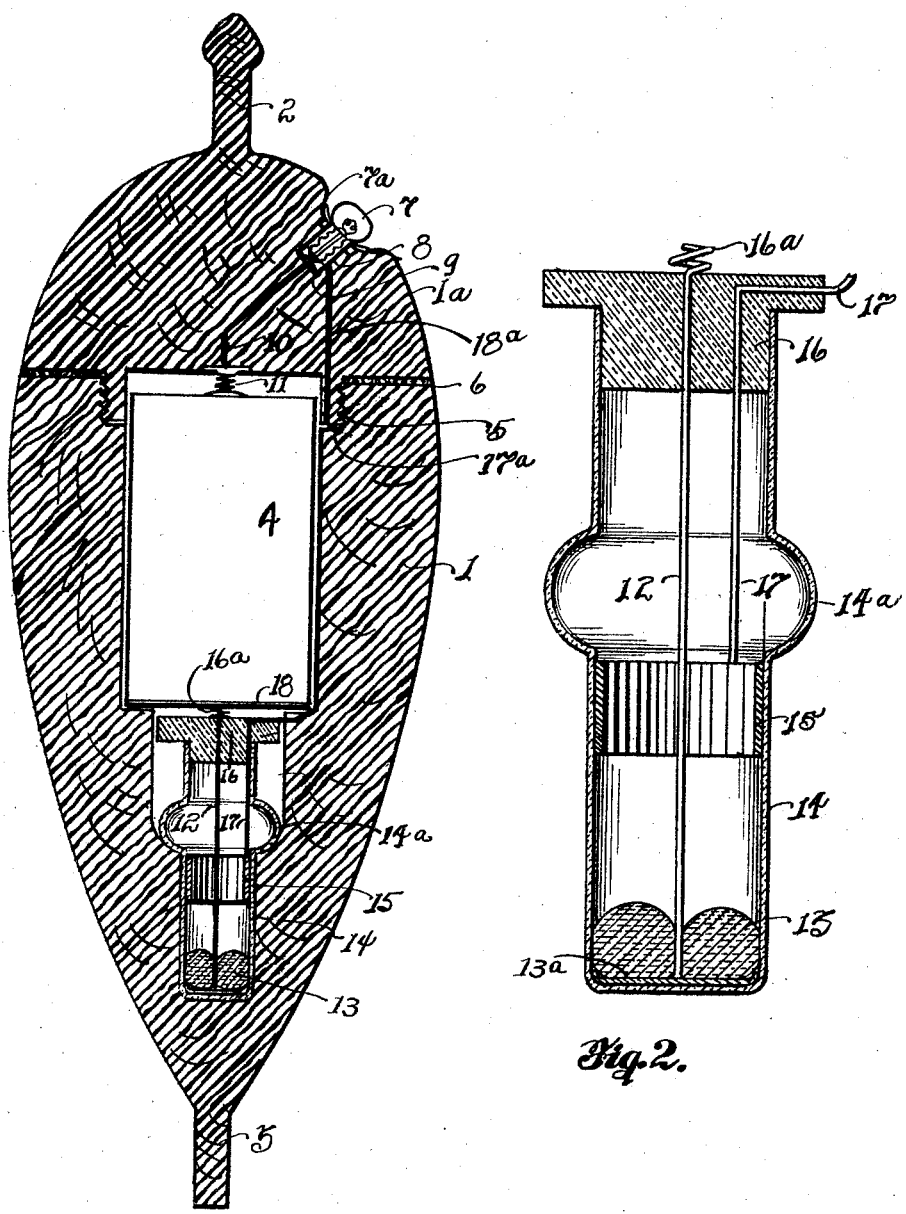
Figure 1 represents a longitudinal view of the invention in cross-section.
Figure 2 represents a detail view of the tube containing the gravity conductor in cross-section.

Following the figures, 1 represents the body of the float, 1ª the cover thereof, 2 an upper extension from said cover, and 3 an extension from the lower portion of the body, both of the latter being adapted to receive and engage the fishline, similar to those on the ordinary fishing float now in common use, 4 represents a battery of the dry cell type fitted into a recess in the body 1, and 5 represents the threads by which the body 1 and the top 1ª are secured together, 6 being a washer of suitable material to render the joining of the threads watertight at all times. 7 represents a suitable electric bulb screwed into means 8, the latter being recessed in the top 1ª. 7ª is the washer between the bulb and the socket to make the junction water tight, and 9 is the spring connection attached to wire 10 to make a certain contact of the wire against the bulb contact. Connection is made through wire 10 to the battery 4 through the spring 11 fastened over the contact point of the battery. Connecting wire 12 passes from the contact spring 16ª on the plate 13ª on the under side of the battery, through the tube 14 and through the tube stopper 16, (the latter comprised of glass or other suitable insulating material) to the bottom of the tube to the gravity controlled conductor 13, made up of mercury or quicksilver, or other suitable liquid conductor.

Another connecting wire 18ª from the means 8, extends to a contact point 17ª between the cover and the body of the float, through connection 17 to brush or hollow cylinder 15 of conductible material.

As the float is tilted from the vertical to an appreciable degree by the presence of a fish on the line, the mercury touches the brush 15 comprising a cylindrical means of hollow construction and makes the circuit from wire 12 causing the light to flash, similarly when a sudden jerk downward occurs the mercury streams upward and makes connection causing the light to flash.

When the float is on its side for carrying purposes or stored away, the mercury rests in the channel 14ª, it, like all liquids, seeking its lowest level.

Variations in construction and arrangements of the different elements may be made without departing from the principles of the invention.

What is claimed is:

1. In a fishing float, or the like, a housing, a cover for said housing, a bulb, a bulb socket, a battery, a tube of non-conductible material conductible liquid means within the tube, a cylindrical means of hollow construction within the tube above the liquid means, connecting means from the liquid means to the battery thence to the bulb, connecting means from the bulb socket to the cylindrical means, said liquid means making contact with said cylindrical means and said battery connecting means, to flash the bulb when the float is suddenly actuated vertically or actuated to other than a vertical position.

2. In a float, means for illuminating said float, when it is suddenly actuated vertically from its point of rest, or when it is inclined substantially from its point of rest said means comprising a source of electrical energy having a connection to a suitable electric bulb, a socket for said bulb, a tube with a cap therefor, said tube and cap of non-conductible material, liquid conductible material within the tube, a connection to the bottom of the tube from the source of energy, another connection from the bulb socket to a fixed conductible means in the upper part of the tube, the connection to the bottom of the tube at its extremity being immersed in liquid conductible material, the latter making a connection to the fixed conductible means when the float is actuated vertically from its point of rest, and means to render said float water tight.

3. A member having an arrangement for flash illumination when said member is suddenly actuated from its point of rest said arrangement comprising a housing, a source of electrical energy in said housing, an electric bulb, a socket for same, a tube and cover therefor in the housing, the two latter being formed of non-conductible material, a liquid conductor in the tube, a fixed conductor in the tube, connections from the liquid conductor to the source of energy to the bulb, and from the bulb socket to the fixed conductor, the liquid conductor being adapted to contact with the fixed conductor when the member is actuated vertically from the point of rest as above mentioned.

In testimony whereof I have signed my name to this specification.

ROBERT C. McELREE.